United States Patent [19]

Spease et al.

[11] Patent Number: 5,435,203
[45] Date of Patent: Jul. 25, 1995

[54] MANUAL SHIFT TWIST ADJUSTOR

[75] Inventors: Arthur L. Spease, Montgomery, Tex.; Joseph M. Laperriere, III, Roseville; Hubert J. Bung, Rochester Hills, both of Mich.

[73] Assignee: Teleflex Incorporated, Limerick, Pa.

[21] Appl. No.: 123,330

[22] Filed: Sep. 16, 1993

[51] Int. Cl.$^6$ .................................................. F16C 1/10
[52] U.S. Cl. ........................... 74/502.6; 74/501.5 R; 74/527
[58] Field of Search ............ 74/500.5, 501.5 R, 502.6, 74/526, 527

[56] References Cited

U.S. PATENT DOCUMENTS

| | | | |
|---|---|---|---|
| 2,869,391 | 1/1959 | Brock | 74/503 |
| 4,193,616 | 3/1980 | Sarson et al. | 285/39 |
| 4,331,041 | 5/1982 | Bennett | 74/501.5 R |
| 4,418,583 | 12/1983 | Taig | 74/501.5 R |
| 4,669,330 | 6/1987 | Stocker | 74/501.5 R |
| 4,688,445 | 8/1987 | Spease et al. | 74/501 R |
| 4,693,137 | 9/1987 | Deligny | 74/501.5 R |
| 4,694,706 | 9/1987 | Lichtenberg et al. | 74/501.5 R |
| 4,751,851 | 6/1988 | Deligny et al. | 74/501.5 R |
| 4,753,123 | 6/1988 | Stormont | 74/501 R |
| 4,798,100 | 1/1989 | Baumgarten | 74/501.5 R |
| 4,833,937 | 5/1989 | Nagano | 74/501.5 R |
| 4,841,806 | 6/1989 | Spease | 74/501.5 R |
| 4,852,425 | 8/1989 | Stocker | 74/586 |
| 4,854,185 | 8/1989 | Lichtenberg et al. | 74/501.5 R |
| 4,854,186 | 8/1989 | Jakob et al. | 74/501.5 R |
| 4,869,123 | 9/1989 | Stocker | 74/501.5 R |
| 4,903,541 | 2/1990 | Shiota | 74/501.5 R |
| 4,987,793 | 1/1991 | Baumgarten et al. | 74/502 |
| 5,119,689 | 6/1992 | Adams et al. | 74/502.5 |
| 5,138,897 | 8/1992 | Beard et al. | 74/501.5 R |
| 5,142,933 | 9/1992 | Kelley | 74/502 |
| 5,144,856 | 9/1992 | Roca | 74/501.5 R |
| 5,156,063 | 10/1992 | Kelley | 74/501.5 R |
| 5,156,064 | 10/1992 | Truman | 74/501.5 R |
| 5,161,428 | 11/1992 | Petruccello | 74/501.5 R X |
| 5,222,411 | 6/1993 | Hedstrom et al. | 74/501.5 R |

*Primary Examiner*—Richard M. Lorence
*Attorney, Agent, or Firm*—Howard & Howard

[57] ABSTRACT

A device (26) for adjusting the length of either the core element (14) or the conduit (12) in a motion transmitting remote control assembly (10) includes an elongated member (28) and a housing (30) for axially movably receiving the elongated member (28). A thumb-controlled locking device (32, 68) locks and unlocks the elongated member (28) within the housing (30). A latch (34) holds the locking device (32, 68) in position. The latch (34) forms a spring-loaded cover (92) surrounding the locking device (32). An operator must manually displace the cover (92) before actuating the locking device (32).

38 Claims, 5 Drawing Sheets

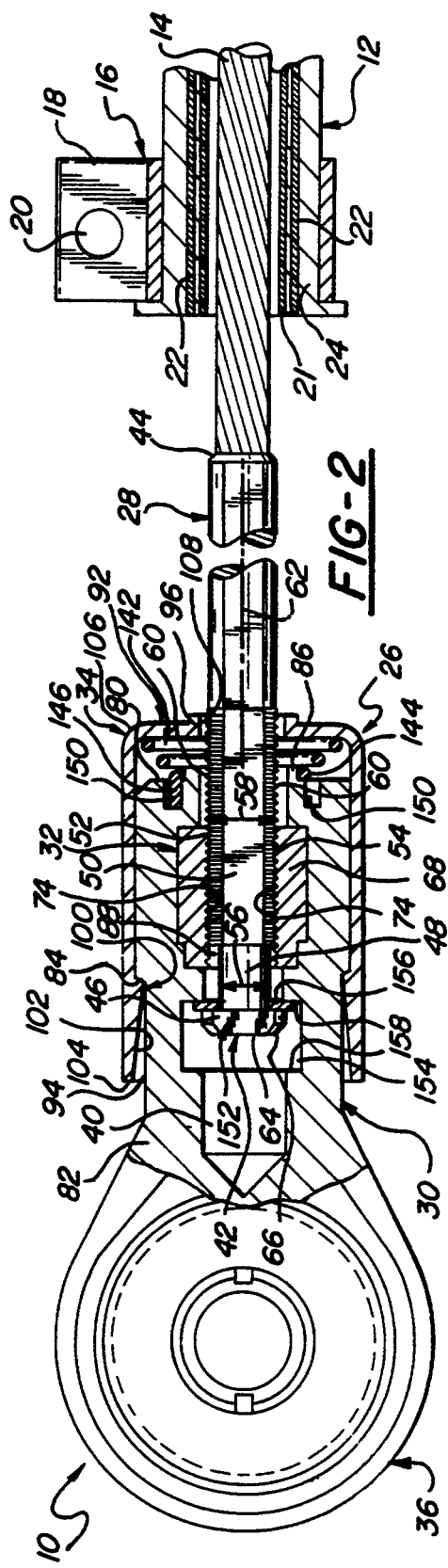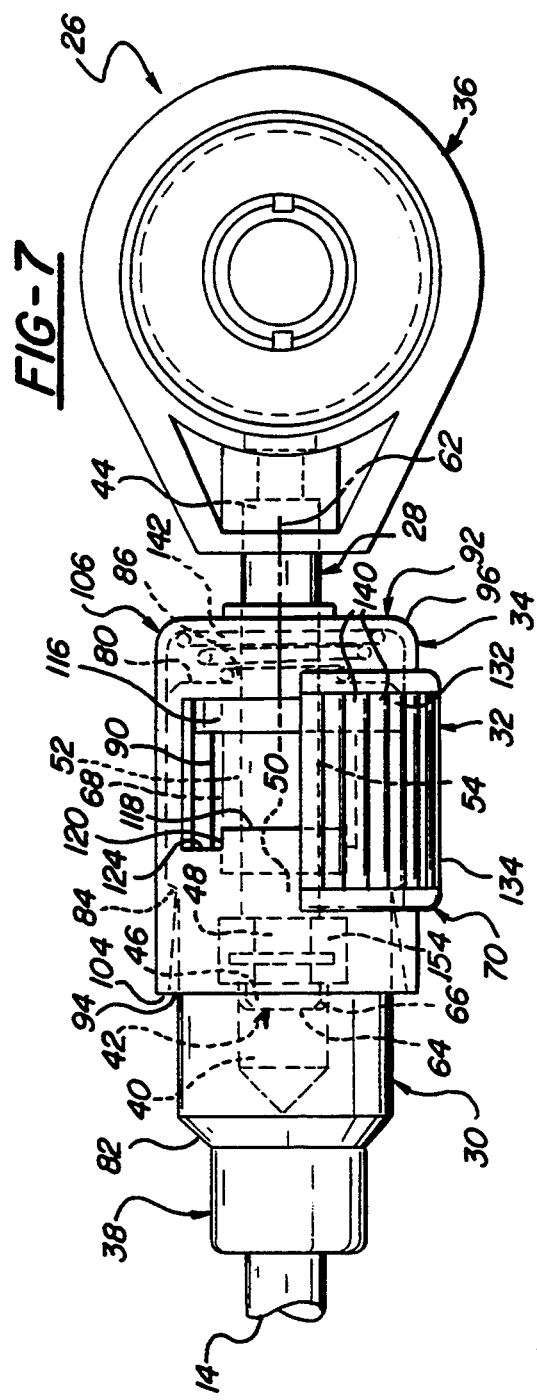

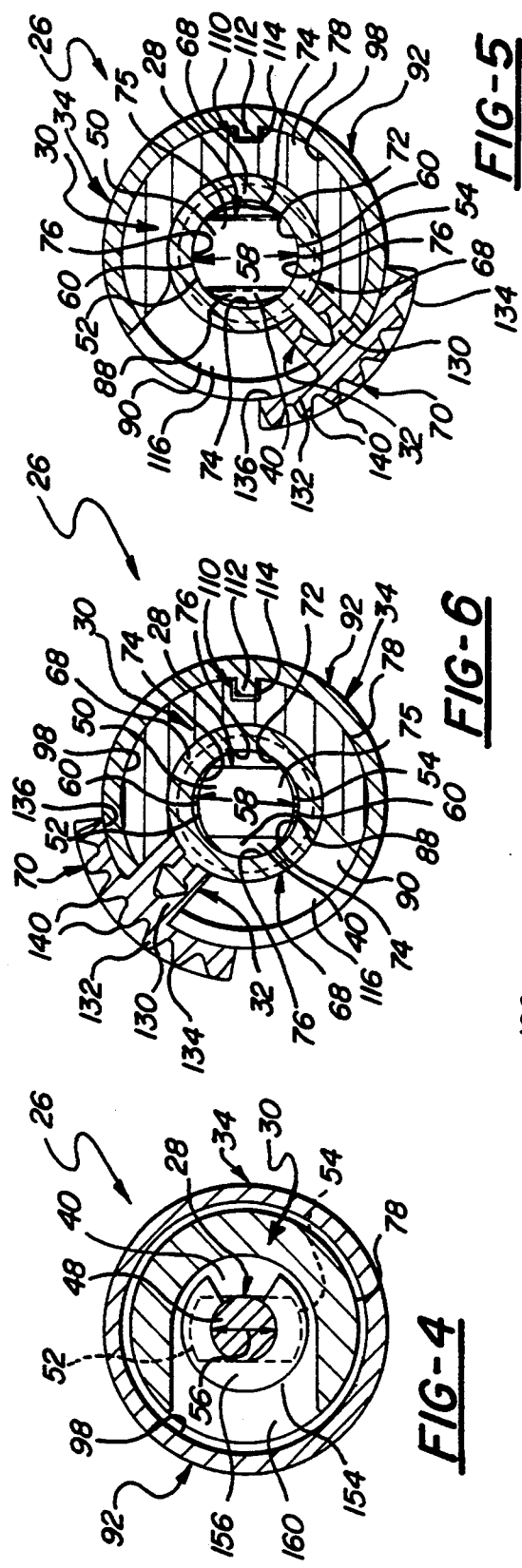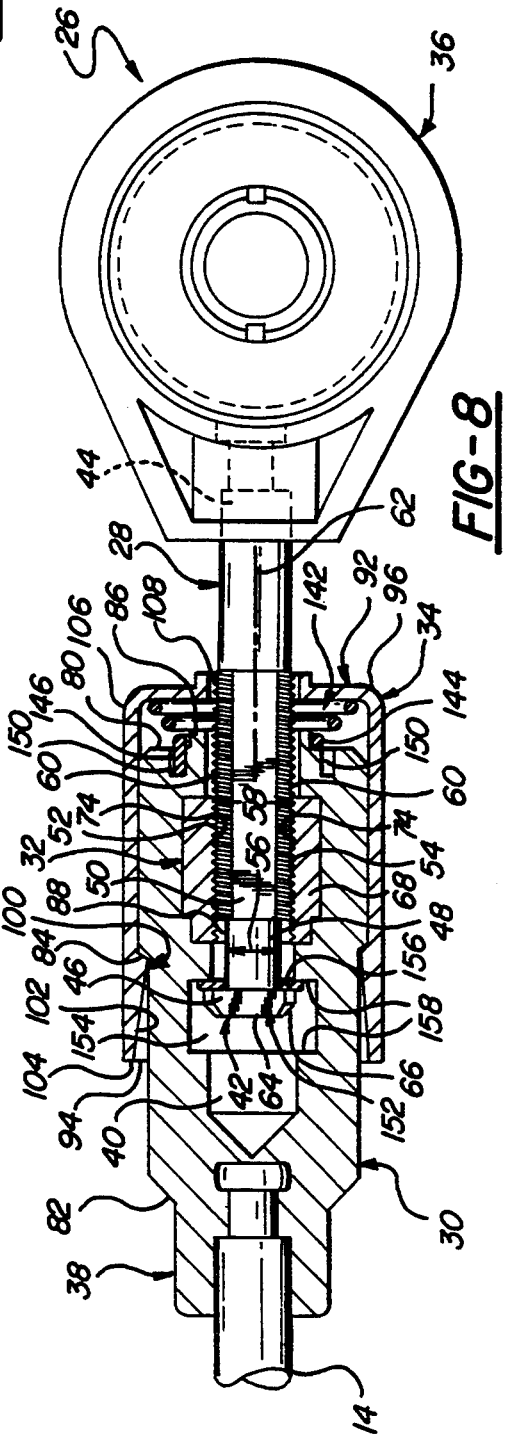

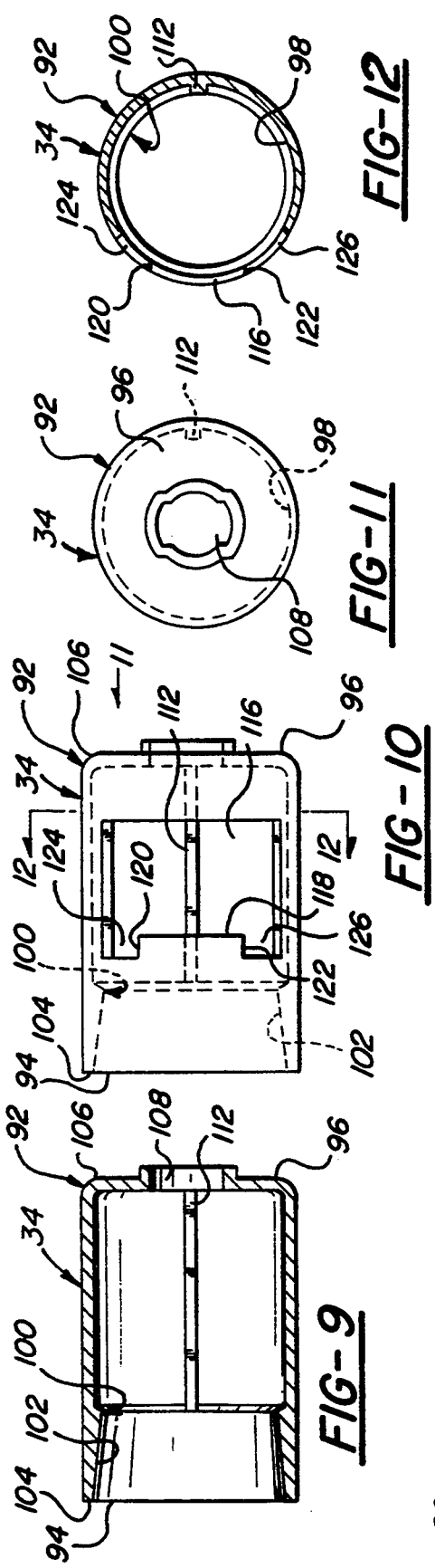
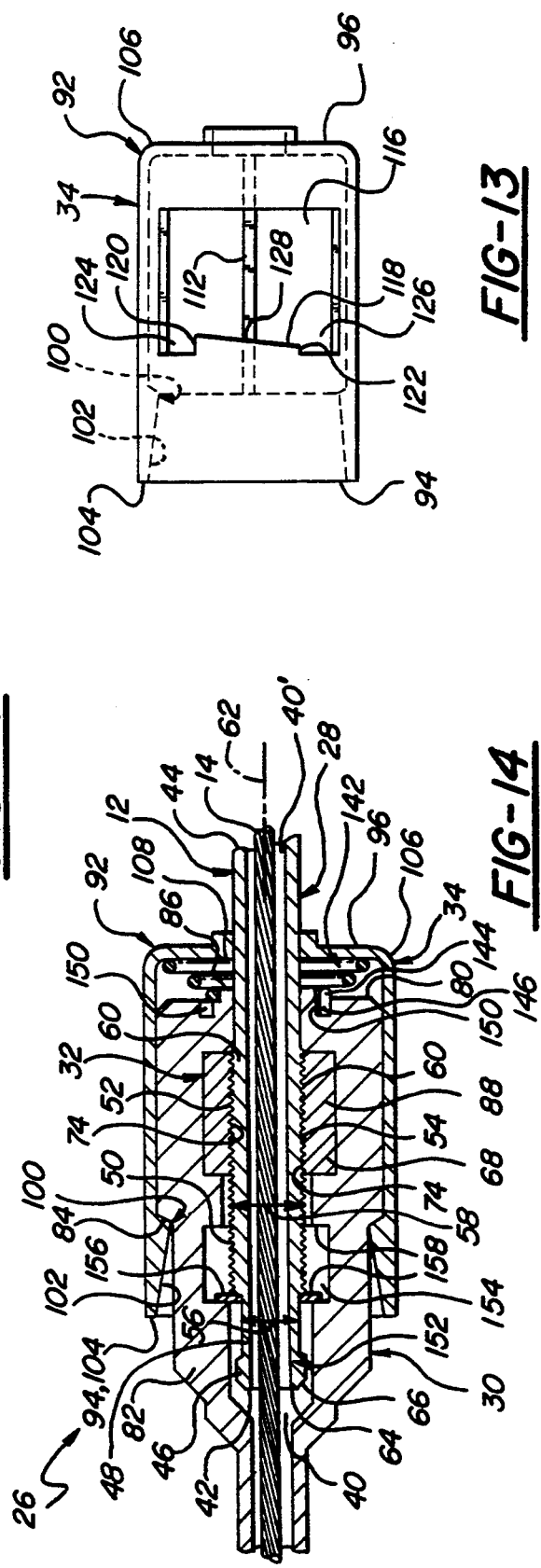

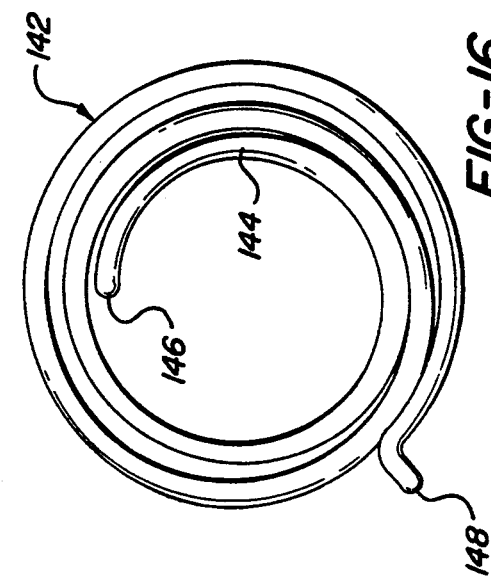
FIG-16
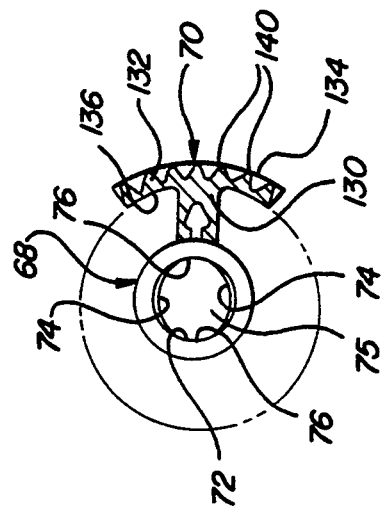
FIG-20
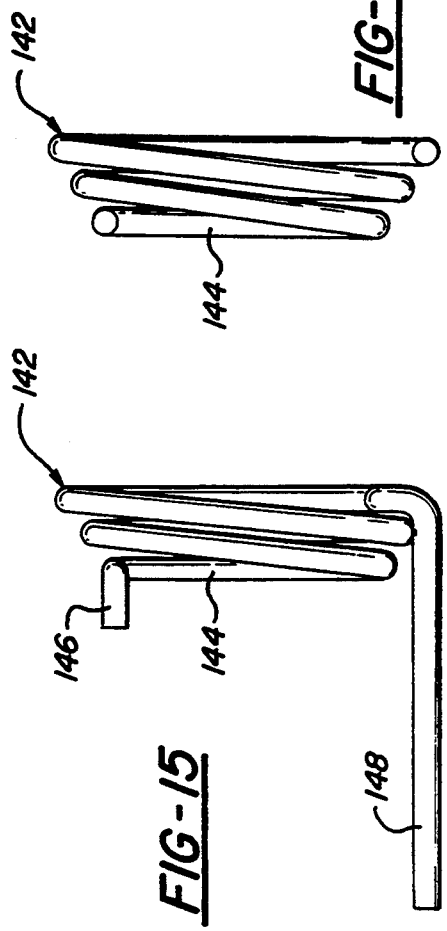
FIG-17
FIG-15
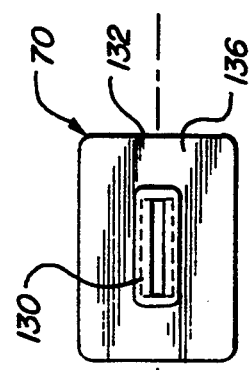
FIG-19
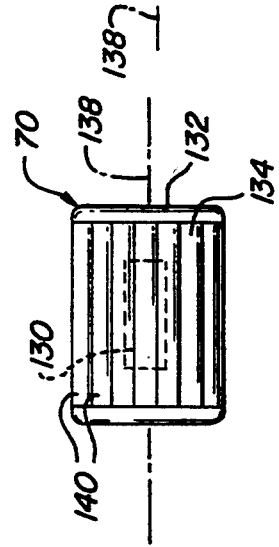
FIG-18

MANUAL SHIFT TWIST ADJUSTOR

TECHNICAL FIELD

This invention relates to a motion transmitting remote control assembly of the type for transmitting motion in a curved path by a flexible motion transmitting core element, and more particularly to such an assembly including a device for adjusting the length of the core element or conduit.

BACKGROUND OF THE INVENTION

Motion-transmitting remote control assemblies must be secure, yet adjustable for adjusting the relative length of the core element and conduit in those assemblies. Adjustment is necessary at installation to insure proper operation of a remotely controlled device through its required mechanical range of control. Periodic maintenance adjustments are also necessary to compensate for slippage and non-elastic deformation of a conduit or core element. It is important, therefore, that the adjustment means be easily adjusted and readjusted. It is also important that the adjustment means be secure; i.e., difficult to inadvertently disengage or engage. Inadvertent disengagement can cause loss of control. In certain applications, inadvertent engagement can cause damage or injury through unplanned activation and improper adjustment/regulation of a controlled device. Inadvertent engagement can also cause costly delays in assembly line processes that depend, for speed, on adjustment devices arriving from the manufacturer in a disengaged, ready-to-install state.

Unfortunately, current adjustment means that provide ease of adjustment are also relatively easy to disengage and/or engage inadvertently. A typical device allows disengagement with a single motion. The device may provide some type of securing means to hold it in a locked position, but this type of securing means is often overrideable by application of the same force and motion that would disengage the locking means.

For example, U.S. Pat. No. 5,156,064 to Truman, issued Oct. 20, 1992 discloses a cable length adjustment device comprising an elongated member, a locking member, and a housing. The housing is typically joined to, or integral with, one length of a control cable with the elongated member joined to or integral with a second length of the same control cable. The housing has a central bore formed to accommodate the end of the elongated member opposite the end attached to the second length of control cable. The housing also holds the locking member which an operator may reposition from either side of the housing. There is a bore through the longitudinal axis of the locking member to allow an operator to position the elongated member within the locking member.

When the locking member is in its locked position it prevents the elongated member from moving relative to the locking member and housing. When the locking member is rotated to its unlocked position it allows adjustment of control cable length by allowing the elongated member to move translationally relative to the locking member and housing. A ledge positioned on the locking member cooperates with a hook-like securing means positioned on the housing means to secure the locking means in its locked position. To unlock the locking means and release the elongated member, an operator (or an inadvertent external force) only need rotate the locking means with enough force to override the securing means.

Another design has securing means to prevent inadvertent disengagement of its locking means. This type of design provides additional security against inadvertent disengagement by requiring a separate motion to overcome its securing means. The design does not, however, guard against inadvertent engagement. It does not require a separate motion to disengage its securing means prior to moving the locking means out of its unlocked position. In other words, the securing means protects against inadvertent disengagement, but not inadvertent engagement.

U.S. Pat. No. 5,161,428 to Petruccello, issued Nov. 10, 1992 and assigned to Teleflex Incorporated, discloses an adjustment means of this type. It is an adjustment means for a motion transmitting remote control assembly that includes a locking clip. The locking clip is moveable between a disengaged position and an engaged position for preventing longitudinal movement between the elongated member and the base (the "base" being the functional equivalent of a "housing"). The locking clip includes two flexible fingers for bracketing and engaging the elongated member. The flexible fingers have securing means for engaging the base. Prior to extracting the locking clip from the base and disengaging the elongated member, an operator must first squeeze the distal ends of the flexible fingers together, disengaging the securing means. However, to move the locking clip out of its unlocked position, tapered surfaces on the securing means allow an operator to override the securing means and engage the locking clip by simply pressing, with a single motion, on the top surface of the locking clip. Consequently, this system has little or no protection against inadvertent engagement.

SUMMARY OF THE INVENTION AND ADVANTAGES

A motion transmitting remote control assembly for transmitting motion along a curved path by a flexible motion transmitting core element. The assembly comprises a conduit, a flexible motion transmitting core element having an axial length and movably supported along its length within the conduit, and adjustment means for adjusting the length of one of the core element and the conduit. The adjustment means includes an elongated member, housing means for axially movably receiving the elongated member, and locking means. The locking means has a locked position for preventing the elongated member from moving axially within the housing means and an unlocked position for allowing the elongated member to move axially. The assembly is characterized by normally engaged latching means for fixing the locking means in either of the locked and unlocked positions. The latching means is independently retracted for repositioning the locking means to the other of the unlocked and locked positions. This arrangement precludes the locking means from being moved inadvertently while the latching means is engaged. An operator may reposition the locking means only after retracting the latching means.

An advantage of requiring an operator to retract the latching means prior to being able to move the locking means out of either its locked or unlocked positions is that it prevents inadvertent engagement and disengagement of the adjustment means. By preventing inadvertent disengagement this design precludes loss of control of the controlled device. By preventing inadvertent engagement the design precludes damage or injury from unplanned activation and improper adjustment or regulation of the controlled device. The design also precludes costly delays that might be experienced in assembly line processes that depend, for speed, on adjustment devices arriving from the manufacturer in a disengaged, ready-to-install state.

BRIEF DESCRIPTION OF THE DRAWINGS

To better appreciate the advantages of this invention, please refer to the following detailed description in connection with the accompanying drawings:

FIG. 2 is a partial-cutaway cross-sectional side view, as in FIG. 1, showing the core element and conduit with the elongated member fully extended;

FIG. 4 is a cross-sectional view of the adjustment means taken along line 4—4 of FIG. 3;

FIG. 5 is a cross-sectional view of the adjustment means taken along line 5—5 of FIG. 3;

FIG. 6 is a cross-sectional view, as in FIG. 5, and depicting the adjustment means moved to a locked position;

FIG. 7 is a side view of the invention's "terminal-adjust" embodiment;

FIG. 8 is a cross-sectional side view of the terminal-adjust embodiment;

FIG. 9 is a cross-sectional side view of the invention's cover;

FIG. 10 is a side view of the cover;

FIG. 11 is an end view of the cover taken along lines 10—10 of FIG. 9;

FIG. 12 is a cross-sectional view of the cover taken along line 12—12 of FIG. 10;

FIG. 13 is a side view of an alternative embodiment of the cover;

FIG. 14 is a cross-sectional side view of an alternative embodiment of the invention;

FIG. 15 is a side view of the spring;

FIG. 16 is an end view of the spring;

FIG. 17 is a side view of an alternative embodiment of the spring;

FIG. 18 is a top view of the button member;

FIG. 19 is a bottom view of the button member; and

FIG. 20 is an end view of the locking means.

DETAILED DESCRIPTION OF THE PREFERRED EMBODIMENT

Figure 1:
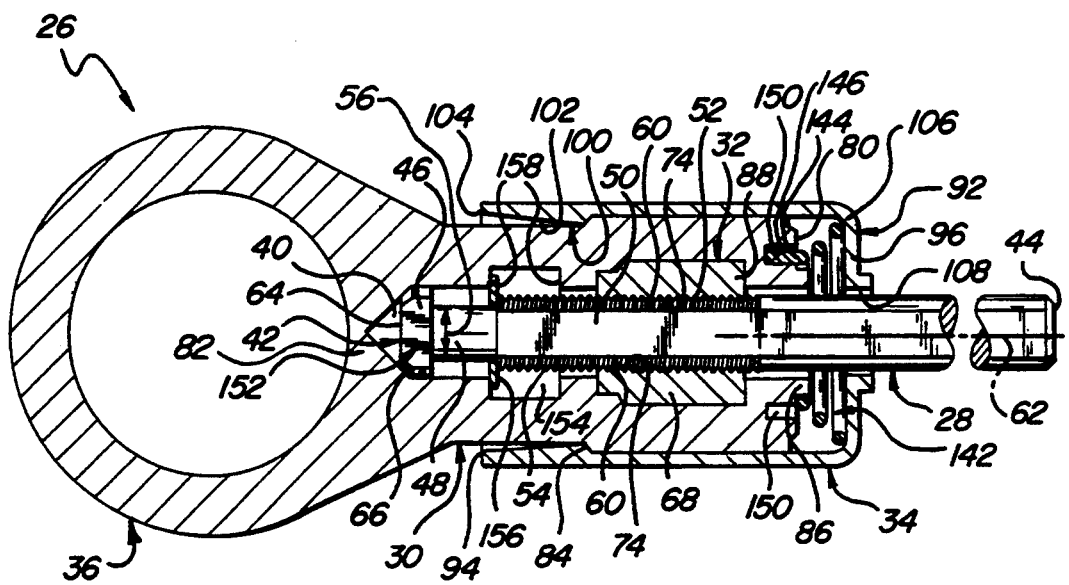
FIG. 1 is a cross-sectional side view of the invention's "cable-adjust" embodiment with the elongated member fully inserted.

The preferred embodiment of a motion transmitting remote control assembly constructed in accordance with the instant invention is generally shown at 10 in FIG. 2. The assembly 10 includes a conduit generally indicated at 12 and a flexible motion transmitting core element 14 that has an axial length and is movably supported along its length within the conduit 12.

Support fittings 16 are disposed about and secured to the conduit 12. Normally a fitting 16 will be disposed at each end of the conduit 12. The support fittings 16 may be any of the well known types such as that shown in FIG. 2, including a flange 18 having a hole 20 therein for receiving attachment means (not shown) such as a rivet, bolt and the like for securing the flange 18 to a support structure (not shown). Additionally, the fittings 16 are preferably made of organic polymeric material.

The conduit 12 is preferably of the known type used in remote control assemblies including an inner tubular member 21 made of an organic polymeric material surrounded by a plurality of filaments or long lay wires 22 disposed on a long lead and encased in an outer jacket 24 of organic polymeric material as best shown in FIG. 2. The organic polymeric material may be of the various known plastics such as polyethylene, etc.

The assembly 10 includes an adjustment means, generally shown at 26 in FIGS. 1–8, and 12, for adjusting the relative lengths between the core element 14 and the conduit 12. In the embodiments of FIGS. 1, 2, 3, 7 and 8, the adjustment means 26 accomplishes this effective length adjustment by allowing the length of the core element 14 to be shortened or elongated depending on the need. Obviously, the adjustment means 26 could be used to adjust the length of the conduit 12 in an alternative embodiment as shown in FIG. 14. The adjustment means 26 accomplishes the effective length adjustment by allowing the conduit 12 to be shortened or elongated depending on need. According to the subject invention, the adjustment means 26 is of the manual type, as distinguished from the automatic, or self-adjust type. Hence, the adjustment means 26 is maintained in an unlocked condition, moved to a correctly adjusted position, then manually locked into the adjusted position.

The adjustment means 26 includes an elongated member, generally indicated at 28, and a housing means, generally indicated at 30, for axially movably receiving the elongated member 28. The adjustment means 26 also includes a locking means, generally indicated at 32. The locking means 32 has a locked position, as shown in FIG. 6, for preventing the elongated member 28 from moving axially within the housing means 30. The locking means 32 also has an unlocked position, as shown in FIG. 5, for allowing the elongated member 28 to move axially. There is a latching means, generally indicated at 34 in FIGS. 1–3, 7, 8 and 12, for fixing the locking means 32 in either of its locked and unlocked positions. An operator must independently retract the latching means 34 before repositioning the locking means 32 to the other of its unlocked and locked positions. Thus, when engaged, the latching means 34 precludes the locking means 32 from moving inadvertently. In other words, an operator may reposition the locking means 32 only after retracting the latching means 34.

The two preferred embodiments of the assembly 10 adjust the length of the core element 14. The first of these is the "cable adjust" embodiment shown at 26 in FIGS. 1, 2, and 3. The "cable adjust" embodiment includes a terminal 36 integrally extending from the housing means 30 opposite the elongated member 28. In this embodiment, the core element 14, or cable, is attached to the elongated member 28.

The second of the two preferred embodiments is the "terminal-adjust" embodiment shown at 26 in FIGS. 7 and 8. The terminal-adjust embodiment is identical to the cable-adjust embodiment except that the terminal-adjust embodiment includes a terminal 36 integrally extending from the elongated member 28 rather than the housing means 30. The end of the elongated member 28 opposite the terminal 36 is inserted into the housing means 30. This second embodiment has cable attachment means 38 extending axially from the end of the housing means 30 opposite the elongated member 28 for attaching the core element 14.

In another possible embodiment of the assembly 10, the adjustment means 26 adjusts the length of the conduit 12, rather than the length of the core element 14. This embodiment is generally shown at 26 in FIG. 14. In this latter embodiment the housing means 30 and elongated member 28 have bores 40, 40' through which a core element 14 extends. The bore 40' through the elongated member 28 extends axially from one end of the elongated member 28 to the other. In this embodiment, the bore 40 through the housing means 30 extends axially from the tip of the elongated member 28 through the end of the housing means 30 opposite the inserted elongated member 28.

In all the embodiments the elongated member 28 is formed from a flatted round steel and zinc plated rod indicated at in FIGS. 1-8. The elongated member 28 includes a first end 42 for insertion into a bore 40 in the housing means 30 and a second end 44 for fastening the elongated member 28 to a device to be remotely controlled (not shown), a cable 14, or a conduit 12. The first end 42 of the elongated member 28 comprises a stopper 46, cylindrical section 48 and engagement section 50. In the embodiments shown in FIGS. 1 through 8 and 14 the stopper 46 and engagement 50 sections have generally identical cross sectional shapes and sizes. However, in other embodiments, the stopper 46 and engagement 50 sections may have different cross sectional shapes and sizes. As shown in FIG. 1, the stopper 46 and engagement 50 sections have opposing arcuate sides 52, 54 respectively. The arcuate sides 52, 54 are spaced 180 degrees apart from the centerline of one side to the centerline of the other side. The diameter 56 of the cylindrical section 48 is smaller than the cross sectional width or diameter 58 of the stopper 46 and engagement 50 sections. The arcuate sides 52, 54 of the engagement section 50 have evenly spaced threads 60 oriented perpendicular to the longitudinal axis 62 of the elongated member 28. The stopper 46 section is flat at its distal end 64 with a beveled circumferential leading edge 66.

The locking means, shown at 32 in FIGS. 1–8 and 12, is formed from steel or zinc and includes a ring member 68 and a button member 70. The button member 70 is fixed to the ring member 68 and protrudes radially outwardly from the ring member 68. The locking means 32 is rotatably disposed within the housing means 30 and is fixed against axial movement within the housing.

The ring member, shown at 68 in FIGS. 5 and 6, has an interior circumference 72 with threaded portions 74 spaced 180 degrees apart around the interior circumference 72. The threads in the threaded portions 74 are oriented perpendicular to the annular axis 62 of the ring member 68. There are two smooth portions 76 positioned between the threaded portions 74. The threaded portions 74 are for meshing with the evenly-spaced threads 60 on the arcuate sides 52, 54 of the engagement section 50 of the elongated member 28 in the locked position. The meshing of the threaded portions 74 of the ring member 68 and the threaded portions 52, 54 of the elongated member 28, as shown in FIG. 6, prevents translational movement of the elongated member 28 relative to the housing means 30. However, when the locking means 32 is in the unlocked position as shown in FIG. 5, i.e., when the threads of the elongated member 28 are not meshed with the threaded sections 52, 54 of the locking means 32, there is sufficient clearance between the elongated member 28 and the ring member 68 to allow for relative translational motion.

The interior circumference 72 of the ring member 68 defines a circular opening 75, best shown in FIG. 20, disposed concentric with the bore 40 of the housing means 30 so as to allow translatory axial movement of the elongated member 28 through the ring member 68 and to allow the elongated member 28 to threadedly engage the ring member 68 through circumferential alignment of the threaded portions 74 of the ring member 68 with the threaded portions 52, 54 of the elongated member 28. The elongated member 28 also prevents the removal of the locking means 32 from the housing means 30.

The housing means 30, generally indicated at 30 in FIGS. 1–3, 7, 8 and 12, has an external circumference 78, a bore 40, a receiving end 80, a first end 82 opposite the receiving end 80, and an exterior ledge 84 disposed around the external circumference 78 of the housing means 30 at the approximate mid-point between the first end 82 and the receiving end 80. However, in other embodiments, the ledge 84 need not be at the midpoint. The housing means 30 has a generally cylindrical shape and is composed of a hard substance such as plastic or metal. The housing means 30 has one of two external shapes depending on which preferred embodiment the housing means 30 is incorporated into.

Figure 3:
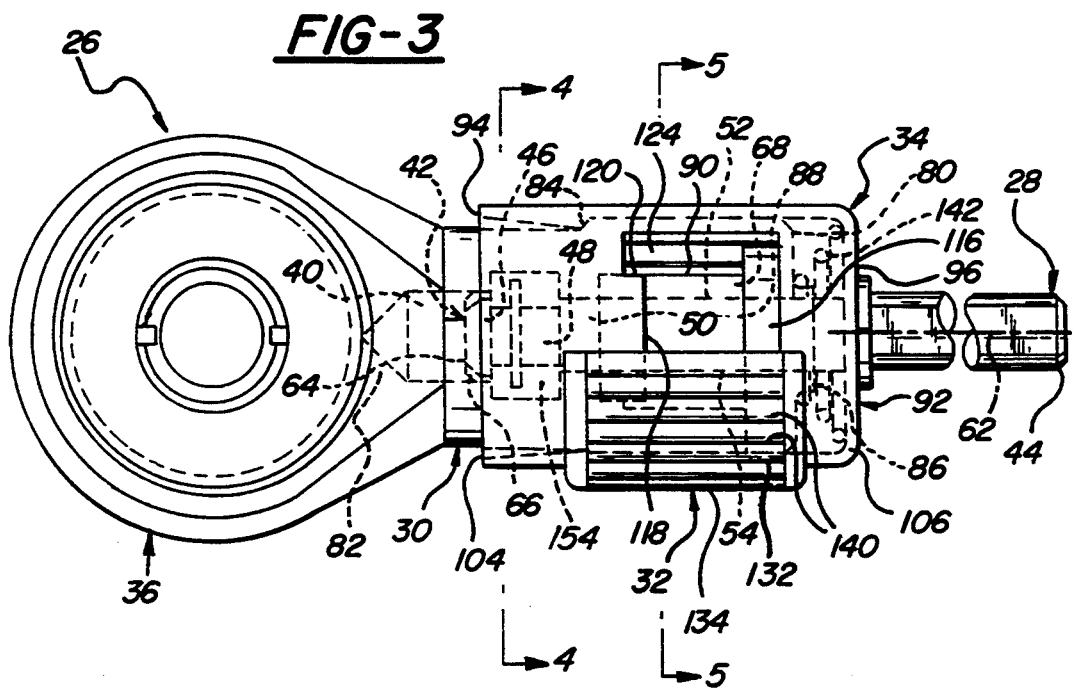
FIG. 3 is a side view of the "cable-adjust" embodiment of FIG. 1.

In the cable-adjust embodiment of FIGS. 1, 2 and 3, the housing means 30 extends integrally and radially from a ring-shaped terminal assembly, generally indicated at 36, having approximately twice the outside diameter of the housing means 30. The housing means 30 has a constant diameter from its receiving end 80 to a point approximately 3/5 the longitudinal distance from its receiving end 80 to the point where the housing means 30 joins the terminal assembly 36, although other proportions would be acceptable. At this point the diameter of the housing means 30 decreases by approximately 5% forming the outer circumferential exterior "ledge" 84 as shown in FIGS. 1, 2, 3, 7, 8 and 14. The smaller-diameter first end 82 of the housing means 30 integrally joins with the terminal assembly 36.

In the terminal-adjust embodiment of FIGS. 7 and 8, the external shape of the housing means 30 is identical to that of the housing means 30 in the cable-adjust embodiment of FIGS. 1, 2 and 3 from the cable-adjust embodiment's receiving end 80 to the point where the first end 82 of the housing means 30 would integrally join the terminal assembly 36. At this point, in the terminal-adjust embodiment, the first end 82 of the housing means 30 does not integrally join the terminal assembly 36 but instead tapers to a third cylindrical-shaped section 38 of even smaller diameter. This final section 38, at the first end 82 of the housing means 30, encases and fixedly retains the end of the core element 14, or cable 14. In other words, in this embodiment, the core element 14 or cable 14 protrudes longitudinally from the first end 82 of the housing means 30.

In all embodiments, the housing means 30 has a bore 40 for receiving the elongated member 28. The bore 40 extends along the longitudinal axis 62 of the housing means 30 from the receiving end 80 to the first end 82 of the housing means 30. The bore 40 has a cross-sectional shape substantially identical to the cross-sectional shape of the elongated member 28 except that it is slightly larger. The bore 40 is only slightly larger to allow sufficient clearance for axial translatory movement of the elongated member 28 while preventing rotational movement relative to the housing means 30. Surrounding the bore 40 opening at the receiving end 80 of the housing means 30 and extending axially from the housing means 30 is a spring location collar 86. The collar 86 extends an axial distance approximately equal to 1/5 the diameter of the bore 40. The thickness of the collar 86 is also approximately 1/5 the diameter of the bore 40. These approximate proportions apply to the embodiments shown in the figures. Other proportions are possible and acceptable without departing from the spirit and scope of the invention.

The housing means 30 has a first internal cylindrical cavity 88, concentric with its bore 40, for encasing and allowing the ring member 68 to rotate about the elongated member 28. The interior shape of the first cylindrical cavity 88 is exactly the same as the exterior shape of the ring member 68 except that it is slightly larger in both length and diameter. The interior shape of the first cylindrical cavity 88 is sufficiently larger to provide clearance for rotational movement of the ring member 68 within.

The housing means 30 has an aperture, shown at 90 in FIGS. 3, 5, and 6, extending through the housing means 30 to the first internal cylindrical cavity 88. The aperture 90 is large enough to allow an assembler to insert the ring member 68 into the first cylindrical cavity 88 in the housing means 30. The aperture 90 also allows the button member 70 of the locking means 32 to protrude from the housing means 30 and allows an operator to rotate the ring member 68, within an approximate 90° arc, between its locked and unlocked positions, from outside the housing means 30. The aperture 90 is a generally rectangular window, cut or formed through the housing means 30 and into the first cylindrical cavity 88 so as to restrict the button member 70 to approximately 90° of rotation between the locked and unlocked positions.

The latching means 34 includes a cover 92 generally indicated in FIGS. 1–14. The cover 92 slidably surrounds a portion of the housing means 30 and is constructed of plastic or metal. The cover 92 has the general shape of an open-ended canister with its inside diameter slightly greater than the largest exterior diameter of the housing means 30.

The cover 92 has an open end 94, a closed end 96, an internal circumference 98 and a ramped interior ledge 100 disposed around the internal circumference 98 adjacent the open end 94. The ramped ledge 100 has a ramped circumferential portion 102 which begins at the rim 104 formed at the open end 94 of the cover 92. The ramped portion 102 extends inward from the rim 104 a distance approximately equal to ¼ the length of the cover 92. At this point the ramp 102 acutely reverses the direction of its slope and radially widens to form the circumferential interior ledge 100. When, during assembly, the cover 92 is slid over the receiving end 80 of the housing means the interior ledge 100 in the cover 92 engages the exterior ledge 84 on the housing means 30 and retains the cover 92 on the housing means 30.

The closed end 96 of the cover 92 is disposed opposite the open end 94 and has a rounded circumferential corner 106. The closed end 96 also has a hole 108 for receiving the elongated member 28. The hole 108 has the same cross-sectional shape and size as the bore 40 of the housing means 30. The hole 108 is axially aligned with the bore 40 when the cover 92 is slid over the housing means 30.

The cover 92 and housing means 30 include antirotation means as shown at 110 in FIGS. 5 and 6 for cooperatively engaging and preventing the cover 92 from rotating relative to the housing means 30. The antirotation means 110 includes a spline 112 disposed axially along the inside of the cover 92, and a mating groove 114 disposed axially along the exterior of the housing means 30 opposite the aperture 90. The spline 112 extends from the closed end 96 to the interior ledge 100 of the cover 92. The groove 114 extends from the receiving end 80 of housing means 30 to the exterior ledge 84 of the housing means 30.

The cover 92 has an opening 116 disposed over the aperture 90 in the housing means 30 and opposite the spline 112. The opening 116 is generally rectangular in shape with a first side 118 disposed adjacent the open end 94 of the cover 92. The cover 92 has detents 120, 122 extending from the first side 118 of the opening 116. The detente 120, 122 engage the button member 70 and hold the locking means 32 in its respective locked and unlocked positions. The detents 120, 122 are spaced apart on the first side 118 of the opening 116 and comprise the inside edges 120, 122 of two rectangular notches 124, 126 cut into the first side 118 of the opening 116.

The button member 70 of the locking means 32 extends from the first cylindrical cavity 88 in the housing means 30, through the aperture 90, and through the opening 116 in the cover 92. The button member 70 is generally indicated in FIGS. 18, 19 and 20 and includes a rectangular shaft 130 and a thumb pad 132. The button member 70 is constructed from a hard substance such as metal or plastic.

The thumb pad shown at 132 in FIG. 20 is formed of metal or plastic in a rectangular arcuate shape. The rectangular thumb pad 132 is curved along its length in the shape of a shallow channel. In other words, the thumb pad 132 has an outer convex surface 134 and an inner concave surface 136. The radius of curvature is constant along the length of the thumb pad 132 to conform to the outer diameter of the cover 92. The thumb pad 132 has a longitudinal axis 138 as shown in FIGS. 18 and 19. The thumb pad 132 is oriented on the cover 92 such that the longitudinal axis 138 of the thumb pad 132 is parallel to the longitudinal axis 62 of the housing means 30.

The rectangular shaft 130 is formed integrally with the thumb pad 132 and extends perpendicularly from the concave side 136 of the thumb pad 132. The rectangular shaft 130 is integrally joined to the ring member 68 such that is extends radially from the ring member 68. The width of the rectangular shaft 130 is approximately the same as the thickness of the ring member 68. The thickness of the rectangular shaft 130 is approximately one-third its width. The rectangular shaft 130 is long enough to place the thumb pad 132 outside the cover 92 with sufficient clearance to slide over the cover 92. The rectangular notches 124, 126 in the opening 116 in the cover 92 are slightly wider than the width of the rectangular shaft 130. The thumb pad 132 provides a surface area for an operator to apply rotational force and move the locking means 32 between its locked and unlocked positions. The outer surface 134 of the thumb pad 132 has longitudinal ridges 140 to more positively engage the surface of an operator's thumb (not shown). This configuration requires an operator to first unlatch the button member 70 by sliding the cover 92 toward the first end 82 of the housing means 30 before the operator can move the locking means 32 out of its locked or unlocked positions.

The latching means 34 includes a tapered, helical wire spring generally indicated at 142 in FIGS. 1, 2, 8, 12, 15, 16 and 17. The spring 142 forcibly urges the first side 118 of the opening 116 in the cover 92 into contact with the rectangular shaft 130 of the button member 70 on the locking means 32. The spring 142 and cover 92 thus cooperate to hold the locking means 32 in either of its locked and unlocked positions when the button member 70 is aligned with one of the rectangular notches 124, 126 in the first side 118 of the opening 116. The spring 142 is disposed between the closed end 96 of the cover 92 and the receiving end 80 of the housing means 30. The end of the tapered spring 142 having the smaller diameter 144 is seated surrounding the collar 86 integrally extending from around the bore 40 in the housing means 30. The spring 142 provides compressional resistance to movement of the cover 92 away from engagement with the button member 70 of the locking means 32. In other words, an operator must forcibly move the cover 92 against the longitudinal compressive force of the spring 142 to disengage the rectangular shaft 130 of the button member 70 from the rectangular notches 124, 126 in the opening 116 in the cover 92.

In one embodiment, the spring 142 also exerts a torsional force on the locking means 32 that urges the locking means 32 toward its locked position. There is a first leg 146 and a second leg 148 extending axially from the helical wire spring 142 for engaging the housing means 30 and the button member 70 respectively. The housing means 30 has a small bore 150 in the receiving end 80 for retaining the first leg 146. The small bore 150 (FIGS. 1 and 2) is parallel to the longitudinal axis of the housing means 30. The second leg 148 rests with torsional force against the rectangular shaft 130 of the button member 70. This configuration allows an operator to insert the elongated member 28 into the housing means 30, then lock the elongated member 28 in position by pressing against the closed end 96 of the cover 92 and causing the latching means 34 to release the locking means 32. The locking means 32 then snaps into its locked position. After inserting the elongated member 28, the operator does not have to push or pull on the elongated member 28. The elongated member 28 finds its own position. In a tight assembly area, an operator may do this with one hand by using his or her thumb to press against the cover 92 while grasping and inserting the elongated member 28 with the remaining fingers of the same hand.

In one alternative embodiment, the spring 142 does not exert a torsional force on the locking means 32 that urges the locking means 32 toward its locked position. The configuration of the opening 116 in the cover 92 as used on this "no-torsion version" of the adjustment means 26 is slightly different than the opening 116 in the "torsion version" described above. On the cover 92 of the no-torsion version, shown in FIG. 13, the notches 124, 126 in the opening 116 include a first notch 124 including a first detent 120 for holding the button member 70 in the locked position and a second notch 126 including a second detent 122 for holding the button member 70 in the unlocked position.

As in the torsion version, the detents 120, 122 are spaced apart on the first side 118 of the opening 116 and comprise the inside edges of rectangular notches 124, 126 cut into the first side 118 of the opening 116. Unlike the torsion version, however, the first side 118 of the opening 116 extends diagonally from the corner of the first rectangular notch 124 to the corner of the second rectangular notch 126. The corner of the second rectangular notch is closer to the open end 94 of the cover 92. In other words, the diagonally-cut first side 118 of the opening 116 essentially creates a ramp 128 between the deeper first rectangular notch 124 and the shallower second rectangular notch 126. This arrangement requires less initial spring 142 compression to move the button member 70 out of the unlocked position, and requires greater spring 142 compression to move the button member 70 out of the locked position. In other words, this configuration makes the adjustment means 26 easier to lock than to unlock. This "no-torsion" alternative embodiment is applicable to any one of the adjustment configurations of FIGS. 1, 8 or 14.

Returning to the preferred embodiments, the adjusting means includes retaining means, shown at 152 in FIGS. 1, 2, 8 and 14, for slidably retaining the first end 42 of the elongated member 28 within the housing means 30. The retaining means 152 includes a second cylindrical cavity 154 in the housing means 30; the stopper 46, cylindrical 48 and engagement 50 sections of the elongated member 28; and a retainer ring 156.

The housing means 30 has a second cylindrical cavity 154 with axially opposing ends 158. The second cylindrical cavity 154 is concentric with the bore 40 of the housing means 30. The second cylindrical cavity 154 is disposed between the first cylindrical cavity 88 and the first end 82 of the housing means 30. This second cavity 154 receives and allows axial translatory motion of the first end 42 of the elongated member 28 and the retainer ring 156. The housing means 30 also has a rectangular access window, shown at 160 in FIG. 4, extending through the housing means 30 to the second cylindrical cavity 154. This access window 160 allows an operator to have access to the retaining means 152. Once the cover 92 is snapped in place, it covers this access window 160.

As described above, the cylindrical section 48 of the elongated member 28 has a cross-sectional size smaller than that of the stopper 46 and the engagement 50 sections. The retainer ring 156 is a washer that slidably surrounds the cylindrical section 48. The washer has an inner diameter larger than that of the cylindrical section 48 and smaller than that of the stopper 46 and engagement 50 sections. The washer has an outside diameter larger than the bore 40 of the housing means 30 and smaller than the diameter of the second cylindrical cavity 154. These proportions allow telescoping translatory movement of the elongated member 28 within the housing means 30. In other words, a retainer or washer 156 surrounds the cylindrical section 48 and acts with the stopper 46 and engagement 50 sections and the ends 158 of the second cylindrical cavity 154 to limit the translational movement of the elongated member 28 within the housing means 30.

This is an illustrative description of the invention using words of description rather than of limitation.

Obviously, many modifications and variations of this invention are possible in light of the above teachings. Within the scope of the appended claims, where reference numerals are merely for convenience and are not limiting, one may practice the invention other than as specifically described.

I claim:

1. A motion transmitting remote control assembly (10) of the type for transmitting motion along a curved path by a flexible motion transmitting core element (14) said assembly (10) comprising:

a conduit (12);

a flexible motion transmitting core element (14) having an axial length and movably supported along said length within said conduit (12);

adjustment means (26) for adjusting said length of one of said core element (14) and said conduit (12);

said adjustment means (26) including an elongated member (28), housing means (30) for axially movably receiving said elongated member (28), and locking means (32) having a locked position for preventing axial movement of said elongated member (28) within said housing means (30) and an unlocked position for allowing axial movement of said elongated member (28);

characterized by latching means (34) normally engaged for fixing said locking means (32) in either of said locked and unlocked positions and independently retracted for freeing said locking means (32) to be repositioned the other of said unlocked and locked positions thereby precluding inadvertent locking and unlocking of said locking means (32) while said latching means (34) is engaged and allowing an operator to reposition said locking means (32) only after retracting said latching means (34).

2. A motion transmitting remote control assembly (10) as set forth in claim 1 further characterized by spring means (142) for forcibly urging said latching means (34) into contact with said locking means 3. A motion transmitting remote control assembly (10) as set forth in claim 2 further characterized by said spring means (142) including torsion means (146, 148) for forcibly urging said locking means (32) toward said locked position.

4. A motion transmitting remote control assembly (10) as set forth in claim 2 further characterized by said locking means (32) rotatably disposed within said housing means (30) and fixed against axial movement within said housing means (30).

5. A motion transmitting remote control assembly (10) as set forth in claim 4 further characterized by said elongated member (28) having a plurality of exterior arcuate threaded portions (52, 54).

6. A motion transmitting remote control assembly (10) as set forth in claim 5 further characterized by said locking means (32) having an interior circumference (72) and threaded portions (74) spaced around said interior circumference and engageable with said exterior threaded portions (52, 54) of said elongated member (28) in said locked position.

7. A motion transmitting remote control assembly (10) as set forth in claim 6 further characterized by said locking means (32) comprising a ring member (68) and a button member (70) fixed to said ring member (68) and protruding radially outwardly from said ring member (68).

8. A motion transmitting remote control assembly (10) as set forth in claim 7 further characterized by said ring member (68) including an opening (75) defined by said interior circumference (72).

9. A motion transmitting remote control assembly (10) as set forth in claim 8 further characterized by said housing means (30) having a bore (40) for receiving said elongated member (28).

10. A motion transmitting remote control assembly (10) as set forth in claim 9 further characterized by said elongated member (28) having a non-circular cross-sectional shape.

11. A motion transmitting remote control assembly (10) as set forth in claim 10 further characterized by said bore (40) having a cross-sectional shape substantially identical to said cross-sectional shape of said elongated member (28) with sufficient clearance to allow axial translatory movement of said elongated member while preventing rotational movement relative to said housing means (30).

12. A motion transmitting remote control assembly (10) as set forth in claim 11 further characterized by said opening (75) in said ring member (68) disposed concentric with said bore (40) of said housing means (30).

13. A motion transmitting remote control assembly (10) as set forth in claim 12 further characterized by said housing means (30) having a first internal cavity (88) concentric with said bore (40) for encasing and allowing rotational motion of said ring member (68) about said elongated member (28).

14. A motion transmitting remote control assembly (10) as set forth in claim 13 further characterized by said housing means (30) having an aperture (90) extending through said housing means (30) to said first internal cavity (88).

15. A motion transmitting remote control assembly (10) as set forth in claim 14 further characterized by said latching means (34) comprising a cover (92) slidably surrounding a portion of said housing means (30).

16. A motion transmitting remote control assembly (10) as set forth in claim 15 further characterized by said cover (92) including an opening (116) disposed over said aperture (90) in said housing means (30).

17. A motion transmitting remote control assembly (10) as set forth in claim 16 further characterized by said cover (92) having detents (120, 122) extending into said opening (116).

18. A motion transmitting remote control assembly (10) as set forth in claim 17 further characterized by antirotation means (110) for preventing said latching means (34) from rotating relative to said housing means (30).

19. A motion transmitting remote control assembly (10) as set forth in claim 18 further characterized by antirotation means (110) comprising a spline (112) and a mating groove (114) disposed axially on one of said cover (92) and housing means (30) respectively.

20. A motion transmitting remote control assembly (10) as set forth in claim 18 further characterized by said housing means (30) having an external circumference (78), a receiving end (80), a first end (82) opposite said receiving end (80), and a ledge (84) disposed around said external circumference (78) of said housing means (30) and adjacent said first end (82).

21. A motion transmitting remote control assembly (10) as set forth in claim 20 further characterized by said cover (92) having an open end (94), an internal circumference (98) and a ramped interior ledge (100), disposed around said internal circumference (98) adjacent said open end (94).

22. A motion transmitting remote control assembly (10) as set forth in claim 21 further characterized by said cover (92) having a closed end (96) opposite said open end (94) with a hole (108) for receiving said elongated member (28).

23. A motion transmitting remote control assembly (10) as set forth in claim 22 further characterized by said spring means (142) disposed between said closed end (96) of said cover (92) and said receiving end (80) of said housing means (30).

24. A motion transmitting remote control assembly (10) as set forth in claim 23 further characterized by said spring means (142) comprising a helical wire spring (142).

25. A motion transmitting remote control assembly (10) as set forth in claim 24 further characterized by said housing means (30) having a second cavity (154) with axially opposing ends (158), concentric with said bore (40) of said housing means (30).

26. A motion transmitting remote control assembly (10) as set forth in claim 25 further characterized by and said elongated member (28) having a retainer (156), axially movable along said elongated member (28) between two established limits, for engaging said opposing ends (158) of said second cavity (154).

27. A motion transmitting remote control assembly (10) as set forth in claim 26 further characterized by said housing means (30) having an access window (160) extending through said housing means (30) to said second cavity (154), said access window (160) for allowing access to said retaining means (152).

28. A motion transmitting remote control assembly (10) as set forth in claim 27 further characterized by said elongated member (28) having a stopper (46) and an engagement section (50) having opposing arcuate sides (52, 54) respectively, said opposing arcuate sides (52, 54) spaced 180 degrees apart.

29. A motion transmitting remote control assembly (10) as set forth in claim 28 further characterized by said arcuate sides (52, 54) of said engagement section (50) having evenly spaced threads (60) for engaging said locking means (32).

30. A motion transmitting remote control assembly (10) as set forth in claim 29 further characterized by said inner circumference (72) of said ring member (68) having two opposing threaded sections (74) spaced 180 degrees apart for meshing with said evenly spaced threads (60) on said arcuate sides (52, 54) of said engagement section (50) of said elongated member (28).

31. A motion transmitting remote control assembly (10) as set forth in claim 30 further characterized by said opening (116) having two detents (120, 122) for holding said button member (70) in said respective locked and unlocked positions.

32. A motion transmitting remote control assembly (10) as set forth in claim 31 further characterized by said opening (116) being generally rectangular in shape with a first side (118) disposed adjacent said open end (94) of said cover (92).

33. A motion transmitting remote control assembly (10) as set forth in claim 32 further characterized by said detente (120, 122) spaced apart on said first side (118) of said opening (116).

34. A motion transmitting remote control assembly (10) as set forth in claim 33 or claim 2 further characterized by said torsion means (146, 148) comprising first and second legs (146, 148) extending axially from said helical wire spring (142).

35. A motion transmitting remote control assembly (10) as set forth in claim 34 further characterized by said housing means (30) having a small bore (150) in said receiving end (80) for retaining said first leg (146) of said spring (142).

36. A motion transmitting remote control assembly (10) as set forth in claim 35 further characterized by said second leg (148) resting with torsional force against said button member (70).

37. A motion transmitting remote control assembly (10) as set forth in claim 36 further characterized by said detents (120, 122) including a first detent (120) for holding said button member (70) in said locked position and a second detent (122) for holding said button member (70) in said unlocked position.

38. A motion transmitting remote control assembly (10) as set forth in claim 37 further characterized by said first detent (120) extending further into said opening (116) than said second detent (122).

* * * * *